United States Patent [19]

Fritsch

[11] 4,382,860
[45] May 10, 1983

[54] DEVICE FOR FILTERING LIQUID OF HIGH VISCOSITY SUPPLIED UNDER PRESSURE, IN PARTICULAR A DEVICE THAT CAN BE CONNECTED TO AN EXTRUDER TO FILTER THERMOPLASTIC MELTS OF PLASTIC COMPOSITION

[75] Inventor: Rudolf Fritsch, Stuttgart, Fed. Rep. of Germany

[73] Assignee: Automatik Apparate-Maschinebau H. Hench GmbH, Grossostheim, Fed. Rep. of Germany

[21] Appl. No.: 306,595

[22] Filed: Sep. 28, 1981

[30] Foreign Application Priority Data

Sep. 26, 1980 [DE] Fed. Rep. of Germany ....... 3036400

[51] Int. Cl.³ .............................................. B01D 29/36
[52] U.S. Cl. .................................... 210/431; 210/432; 251/145
[58] Field of Search ........................ 210/773, 420–423, 210/429–432; 251/145, 146; 425/197, 199

[56] References Cited

U.S. PATENT DOCUMENTS

| 3,814,125 | 6/1974 | Demi .............................. 251/145 X |
| 4,188,970 | 2/1980 | Maidment et al. ............. 251/145 X |
| 4,202,659 | 5/1980 | Kinoshita ....................... 425/199 X |
| 4,281,935 | 8/1981 | Cramer et al. .................. 251/145 X |

FOREIGN PATENT DOCUMENTS

907495 10/1962 United Kingdom ................ 251/145

*Primary Examiner*—Robert H. Spitzer
*Attorney, Agent, or Firm*—George E. Kersey

[57] ABSTRACT

A filter for high pressure, high viscosity fluids, such as thermoplastic melts, in which a filter channel contains a valve with a stem equal to the largest diameter of the valve seat.

9 Claims, 3 Drawing Figures

DEVICE FOR FILTERING LIQUID OF HIGH VISCOSITY SUPPLIED UNDER PRESSURE, IN PARTICULAR A DEVICE THAT CAN BE CONNECTED TO AN EXTRUDER TO FILTER THERMOPLASTIC MELTS OF PLASTIC COMPOSITION

The invention is directed to a device for filtering liquids of high viscosity supplied under pressure, in particular a device that can be connected to an extruder to filter thermoplastic melts of plastic composition, said device having at least two exchangeable filters attached in sealing relation to the end plane of a valve body, said filters being supplied with liquid through an annular passage in such a manner that the valve stems of the lift valves located at the branches of the annular passage remain surrounded by liquid also when the valve is closed, as a result of the clearance surrounding the valve stems.

Such a device is already familiar from DE AS No. 2049879. In that arrangement illustrated, customary lift valves are provided with valve shafts considerably thinner with respect to the valve discs, resulting automatically in a clearance around the thin valve shaft when a valve is closed. This clearance has the same diameter as the valve seat. The annular passage ends in this clearance at right angles to the axis of said space, the diameter of the passage being smaller than the draw of the lift valve. The rearward stop face touched by the valve disc when the valve is in an open position is tapered such that an annular space is formed when the valve is in an open position, said space increasing in size toward the valve shaft. This construction causes liquid to accumulate in the annular space primarily during the transition of the lift valve from a closed to an open position, said space not being flushed through when the valve is open. Furthermore, areas result in the clearance directly behind the discharge location of the annular passage in the direction of draw of the lift valve, that can be reached by the liquid only following diversion at right angles. Accordingly, it is also possible that to a certain extent sections of these areas fall outside the range of intense fluid flow. These effects might lead to the undesireable result that whenever liquids are processed that are sensitive to stagnation periods at higher temperatures, respective parts of the liquid are damaged, thereupon repeatedly polluting the liquid being processed.

The problem basic to the present invention resides in constructing the lift valves of the device described in the claims such that the liquid flows around the valve stems, respectively flushes the clearance with certainty when the valve is open and also when it is closed, said flushing through always encompassing the total amount of liquid, so that no areas exist in which parts of the liquid are held back or accumulate.

This problem is solved by having the diameter of the shaft of the valve stem be equal to the largest diameter of the valve seat, by having the shaft casing that surrounds the shaft in sealing relation, extend up to the clearance broadened with respect to the valve seat, the height of said space measured in the direction of draw being essentially equal to the diameter of the annular passage, whereby the front edge of the shaft when the respective valve is open ends approximately at the surface of the clearance, and by having the valve stem in a closed position penetrate the wall of the valve body in a sealing relation up to the end plane of the valve body.

Due to constructing the shaft of the valve stem to have a diameter equal to the largest diameter of the valve seat, and construction of the shaft casing in a sealing relation around the shaft, no closed off area remains whatsoever when the valve is in an open position, because the valve stem always completely fills the shaft casing. Since the shaft casing surrounding the shaft in sealing relation reaches up to the clearance and the front edge of the shaft when the valve is open ends approximately at the surface of said clearance, said shaft neither protrudes into the clearance nor does an area result extending into the shaft casing that might be reached by the liquid, so that when the valve is open no liquid can stagnate whatsoever with certainty. With respect to the valve seat, the clearance has been broadened, i.e., the liquid flowing from the annular passage into the clearance branches off at the stem which has a diameter equal to the valve seat, and flows around the same on paths beyond the diameter of the valve seat. Construction of the valve of the present invention differs from the valve arrangement of DE AS No. 2 04 98 79 also in that respect. Finally, no liquid whatsoever can stagnate in the area of the valve body when the valve is closed, because in that position the valve stem penetrates the wall of the valve body in sealing relation up to the end plane of the valve body. This means that arranging the valve seat between the end plane of the valve body and the neighbouring end plane of the clearance, the valve stem penetrates the valve body in bores into which it sits in sealing relation leaving no space open in which liquid might stagnate. In addition, as a result of terminating the valve stem with the end plane of the valve body a practically smooth surface results even when the valve is closed, which surface can readily be cleaned when removing the filter attached to the valve body for the purpose of cleaning or replacing it.

DE-PS No. 2403765 teaches the use of a lift valve in connection with a pure shut-off valve without the use of an annular passage, the valve shaft of which being equal to the largest diameter of the valve seat. However, since flow is intentionally stopped when the valve is closed, conditions prevail in the case of the known valve which cannot be compared with those influential upon the use of an annular passage, since the annular passage precisely prevents stopping an existing flow. Accordingly, DE-PS No. 2403765 cannot be of any influence concerning the construction of a lift valve assembly involving an annular passage.

Furthermore, familiar from DE-PS No. 22 39 943 is a filter device, in particular for spinning solutions and having two exchangeable filter units, providing a double valve each at the inlet and the outlet, said valve constructed such that its stem has two facing valve seats between which the stem is tapered. The port for the spinning dope is located in the tapered area. Moving the stem in axial direction either closes the one or the other valve seat, so that an outlet passage or inlet passage respectively located subsequent to or in front of a valve seat is supplied with spinning dope or not. The stem, or valve shaft, has the same diameter as the valve seat. When the respective filter is exchanged in this device, spinning dope remains in the respectively closed off outlet passage or inlet passage, so that the spinning dope can undergo chemical decomposition due to the presence of oxygen. Such impaired spinning matter remains in the respective inlet or outlet passage, it is pushed out when the respective valve is opened and can possibly immediately dirty a newly inserted filter, or finds its way in an unfiltered state into the passage coupled at the outlet side to the filter device and subsequently perhaps to the spinning nozzles. In order to prevent this, the respective inlet or outlet passages must be cleaned before the respective valve is opened again, which cleaning is connected with difficulties. In particular, the stem might thereby be damaged because cleaning must proceed directly up to the sealing wall of the stem. Apart from that, this known filter device is not of the type which is a prerequisite for the subject matter of the present invention, namely a device provided with an annular passage. For this reason conditions prevailing upon use of the filter device of DE-PS No. 22 39 943, cannot be compared with those of the device persuant to the present invention.

Suitably, the clearance space of the lift valve of the present invention has a cylindrical shape and is positioned coaxially to the stem axis, whereby the cross section of said space remaining in the closed position of the stem corresponds essentially to the cross section of the annular passage. When the valve is closed, the clearance space practically provides the same flow resistance as the annular passage itself, so that the liquid as a whole will flow in the annular passage without encountering a change in resistance.

The transitions of the cylindrical wall of the clearance space to its end planes and the transitions of the annular passage to the clearance space have preferably rounded contours to permit flow of the liquid to proceed as irrotational as possible.

The valve seat is suitably placed in the valve body closer to its end plane than to the end plane of the clearance. In this instance the valve stem must bridge in sealing relation only a comparatively short stretch up to the end plane of the valve body in front of the valve seat when in a closed position. This length of necessity protrudes in the open position of the stem with respect to the relative end plane of the clearance. Thus, the closer the valve seat is to the end plane of the valve body, the shorter is the distance the stem has to bridge, projecting correspondingly less into the clearance space when the stem is in an open position, thus assisting uniformity of flow in said clearance when the stem is in an open position. In addition, the clearance cross section thereby remains practically unchanged when the stem is in an open position. Otherwise, the height of the clearance measured in draw direction of the valve would have to be of a greater dimension.

The above-mentioned bridging of the area between the valve sealing surface and end plane of the valve body is suitably accomplished by means of a cylindrical extension of the stem with which the valve stem is provided subsequent to its valve sealing surface and which in a closed position extends down to the end plane of the valve body. This cylindrical stem extension can readily be fitted to a corresponding bore in the valve body in a sealing manner.

In order to construct valve stem and valve body with the smallest tolerances possible, a hardened material is used for the valve stem and the valve body surrounding the same at least for the vicinity of its surface areas. This avoids grinding of the valve stem into the valve body with certainty; furthermore, the required seals can thereby be achieved.

Suitably the same material is used for the valve stem and the valve body because they would expand to the same degree when being heated up.

An advantage of the construction is to have the valve body manufactured as an insert for the annular passage chamber and the filter screwed to the annular passage chamber, because in this instance the filter can be pressed in sealing relation to the end plane of the insert and the same pressed with one sealing surface to a corresponding sealing surface of the annular passage chamber. In this way a seal between the insert and the annular passage chamber is automatically achieved upon screwing the valve body to the annular passage chamber.

If a filter is employed through which a device under pressure is to be supplied, then a valve should be positioned in known fashion in front of and in back of each filter. Both valves are closed when the filter is exchanged. After exchanging the filter, the same must first be vented before new liquid is supplied. DE AS No. 2049879 mentioned provides a vent that can be selectively opened or closed, said vent located in the pipe area following the filter and in front of the outlet valve. Accordingly, when a newly exchanged filter is being filled, a region in front of the outlet valve exists which might possibly be difficult to vent.

In the case of the device pursuant to the present invention, vents provided for the type of operation just mentioned are located on the end plane of the stem of the outlet valve that can be closed by a similarly constructed lift valve. In this instance, the liquid flowing into the filter must proceed up to the outlet valve in order to press the air previously in the filter out so that no residual air will remain in the filter. Using a similarly constructed lift valve achieves terminating the respective valve stem at the end plane of the valve stem of the outlet valve for the vent in a closed lift valve, so that also in this instance no pockets are formed which might restrict the flow, causing the liquid to stagnate.

The Figures illustrate one embodiment of the present invention. As represented

Figures 1, 2, 3:
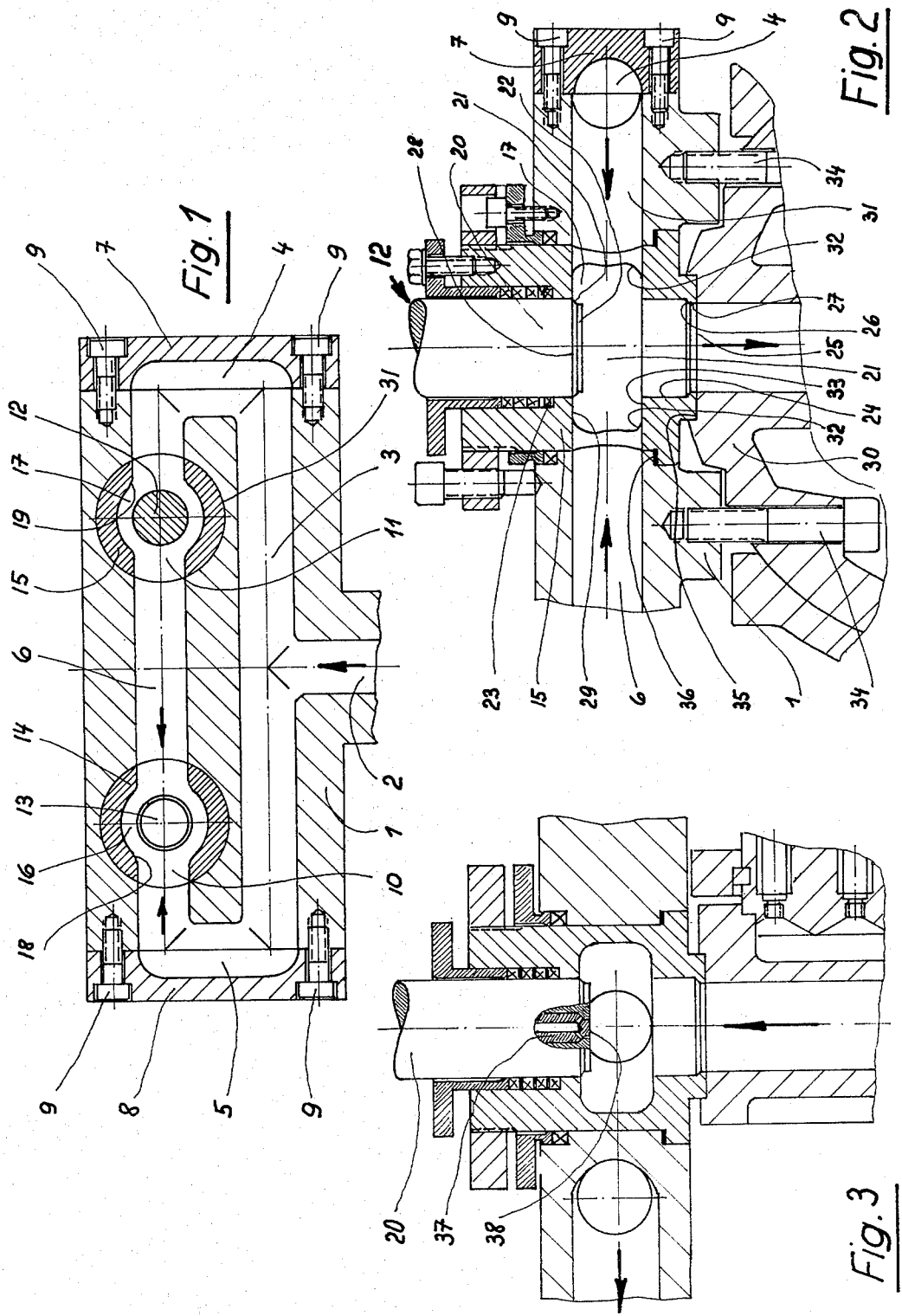
FIG. 1 shows the annular passage with supply inlet and two valves.
FIG. 2 shows one valve and cross section together with a filter.
FIG. 3 shows a similarly constructed valve with a vent.

FIG. 1 illustrates an annular passage chamber (1), into which the supply (2) of liquid leads, which supply might be connected to the exit of a worm extruder. The inlet (2) leads into branch (3) of the annular passage from which the other branch (6) of the annular passage can be reached via reversing sections (4 and 5). Each of the two passage branches (3 and 6) and the reversing sections (4 and 5) are of circular cross section. Each of the reversing sections (4 and 5) are closed off toward the outside by covers (7 and 8), each of which attach to the annular passage chamber (1) by means of the screws (9). Covers (7 and 8) are necessary in order to provide the annular passage in the region of reversing sections (4 and 5). Furthermore, these covers facilitate cleaning the annular passage, for which purpose they can be removed from the annular passage chamber (1).

The two lift valves (10 and 11) are arranged within the region of branch (6), lift valve (11) illustrated as being in a closed position. Its valve stem (12) is thus shown in cross section. Accordingly, the liquid flow emanating from the liquid inlet (2) divides, passing into both sides of branch (3) and reaching valve (10) directly via the reversing section (5), whereas the liquid proceeding through reversing section (4) first flows around stem (12) to subsequently reach valve (10). Since valve (10) is in an open position, the liquid proceeding in that direction exits here. Whenever valve (11) is open and valve (10) is closed, the reverse procedure takes place, the liquid correspondingly flowing around the valve stem not illustrated here for valve (10) and exiting through valve (11). Valve seat (13) is shown for valve (10) in FIG. 1.

In accordance with FIG. 1, both valves (10 and 11) are provided with special valve bodies (14 and 15), each respectively set into the annular passage chamber (1) as insert. The construction of these inserts will be explained in more detail in connection with FIG. 2.

As illustrated in FIG. 1, valve stem (12) and valve seat (13) are each surrounded with a clearance space (16), respectively (17), of cylindrical construction and positioned in coaxial relation to the stem axis, said form being cylindrical without regarding the connecting points to branch (6) and the reversing sections (4 and 5). Rounded off sections (18), respectively (19) are provided for the transitions to the reversing sections (4 and 5) and branch (6), to thus ensure irrotational flow.

FIG. 2 illustrates an opened lift valve in detail, corresponding to the valve (11) of FIG. 1. FIG. 2 shows the reversing section (4), the cover (7) and the screws (9), furthermore a part of branch (6). The rest of branch (6) is cut off. In accordance with the arrows as drawn in for branch (6) and the reversing section (4), the liquid flows toward the clearance (17), above which valve stem (12) shown in an open position is illustrated, as are also valve shaft (20), valve sealing surface (21) and stem extension (22). Valve shaft (20) is guided by the valve body (15), the latter sealed off from valve shaft (20) by means of seals (23).

On the side of valve body (15) opposite to valve shaft (20), said body is provided with a bore (24) of the same diameter as valve shaft (20). Slightly above the end plane (25) of valve body (15), the bore (24) narrows down onto valve seat (26) fitting onto the valve sealing surface (21) of valve shaft (20). Subsequent to the valve seat (26) is bore (27), its diameter equal to that of stem extension (22). Consequently, when the valve is closed, valve shaft (20) is sealingly engaged in the bore (24), and stem extension (22) sealingly engaged in the bore (27), whereby valve sealing surface (21) and valve seat (26) are positioned one on top of the other effecting closing of the valve. As a consequence, there is no dead space whatsoever in which liquid might accumulate within the region of the respective wall of valve body (15) when the valve is closed.

As FIG. 2 furthermore shows, the front edge (28) of valve shaft (20) as illustrated in the open position, terminates with the respective end plane (29) of clearance (17), so that valve shaft (20) pushes completely through the respective wall of valve body (15) without leaving any dead space free in which liquid might accumulate. On the other hand, valve shaft (20) with its front edge (28) does not extend beyond end plane (29), because otherwise flow resistance in the clearance space (17) in an open position as illustrated might unnecessarily be impaired. Only valve sealing surface (21) and stem extension (22) are located in front of the front edge (28) of valve shaft (20). However, said stem extension is only very short because valve seat (26) at the end of bore (24) is located close to the end plane (25) of the valve body (15). The stem extension (22) has the same length as does bore (27), so that when the valve is closed stem extension (22) with its end plane terminates at the end plane (25) of the valve body. This enables simple cleaning of the end plane (25) and the end plane of stem extension (22) when a filter (30) is removed. Furthermore apparent from FIG. 2 is that the cylindrical outer surface (31), (see the top view in FIG. 1) of the clearance (17) continues as end surfaces (33 and 29) via the rounded off sections (32). Irrotational introduction or removal of the liquid is possible because of the rounded off sections (18 and 19), as well as the rounded off sections in the entire inlet region of branch (6), respectively the reversal section (4), of clearance space (17).

It is further apparent from FIGS. 1 and 2 that when the valve is closed, the cross section of the clearance (17) remaining essentially corresponds to the cross section of branch (6), respectively reversing section (4), so that when the valve is closed the liquid flowing around valve stem (12) has practically no increased flow resistance that has to be overcome. FIG. 2 shows in addition that the diameter of branch (6), respectively the reversing section (4), is equal to the height of clearance space (17), so that no step has to be overcome when the liquid flows into or out of clearance space (17).

Persuant to FIG. 2, filter (30) is screwed onto annular passage chamber (1) by means of screws (34). When screwed on, filter (30) presses by means of its sealing surface (35) against the end plane (25) of valve body (15), the end plane of the latter also constructed as a sealing surface, so that when screws (34) are pulled in place, filter (30) is pressed in sealing relation to valve body (15). The pressure of sealing surface (35) onto end plane (25) is transferred to the valve body (15) which in turn presses against a corresponding sealing surface of the annular passage chamber (1) by means of sealing surface (36) constructed in step form, so that the valve body (15) is simultaneously sealed off here against the annular passage chamber (1).

As already explained further above, the lift valve described can be used in connection with exchangeable filters coupled at the inlet side to such lift valve serving as supply valve and coupled at the outlet side with such lift valve serving as discharge valve, so that the liquid can be conducted through the filter to a pressurised device. In that case, the supply valve and also the discharge valve must be closed when the filter is exchanged. As explained already above, a vent is provided in the side of the discharge valve for such instance, which vent lets air out contained in the filter after the filter has been exchanged and the liquid supply renewed. According to FIG. 3, the vent provided in the valve stem proceeds in coaxial direction, in the case of lift valve (37) constructed as the lift valve illustrated in FIG. 2, operation is such that when the lift valve (37) is closed, a smooth, continuous end surface (38) of the respective valve shaft (20) results. When the lift valve (37) is opened, the vent is open so that the air is released.

I claim:

1. A device for filtering liquids of high viscosity supplied under pressure, in particular a device that can be connected to an extruder to filter thermoplastic melts of plastic composition, said device having at least two exchangeable filters attached in sealing relation to the end plane of a valve body, said filters being supplied with liquid through an annular passage in such a manner that the valve stems of the lift valves located at the branches of the annular passage remain surrounded by liquid also when said valves are closed, as a result of the clearance space surrounding the valve stems, characterised by the shaft of the valve stem being equal to the largest diameter of the valve seat and the shaft casing that surrounds the shaft in sealing relation extending up to the clearance space broadened with respect to the valve seat, the height of said space measured in the direction of draw being essentially equal to the diameter of the annular passage, whereby the front edge of said shaft when the respective valve is open approximately ends at the surface of the clearance space, and by having the valve stem in a closed position penetrate the wall of the valve body in a sealing relation up to the end plane of the valve body.

2. The device of claim 1 characterised by a clearance space of cylindrical construction positioned coaxial to the stem axis, whereby the cross section of said space that remains when the stem is in a closed position corresponds essentially to the cross section of the annular passage.

3. The device of claim 2 characterised by rounded off transition sections between the cylindrical wall of the clearance space and its end planes.

4. The device of claims 2 or 3 characterised by rounding off the transition sections between the annular passage and the clearance space.

5. The device of claim 1 characterised by positioning the valve seat in the valve body closer to its end plane than to the end plane of the clearance space.

6. The device of claim 1 characterised by providing the valve stem subsequent to its valve sealing surface with a cylindrical stem extension extending in closed position up to the end plane of the valve body.

7. The device of claim 1 characterised by a valve stem and its surrounding valve body consisting of hardened material at least within the area of their surfaces.

8. The device of claim 1 characterised by constructing the valve body as insert into an annular passage chamber and screwing the filter to said annular passage chamber, whereby said filter is pressed in sealing relation to the end plan of said insert and said insert with a sealing surface pressed against a corresponding sealing plane of the annular passage chamber.

9. The device of claim 1 characterised by providing as vent in the case where a valve is positioned in back of the filter, an opening on the front end of the stem of the discharge valve, said vent being closeable by means of a similarly constructed lift valve.

* * * * *